Patented Apr. 15, 1952

2,592,629

UNITED STATES PATENT OFFICE 2,592,629

FORMYLATING AND REDUCING NONALPHA TOCOPHEROLS

Leonard Weisler, Rochester, N. Y., assignor, by mesne assignments, to Eastman Kodak Company, Rochester, N. Y., a corporation of New Jersey No Drawing. Application October 27, 1949, Serial No. 123,987

15 Claims. (Cl. 260—333)

This invention relates to the treatment of tocopherol material characterized by having vitamin E activity.

Tocopherols are a group of related compounds possessing vitamin E biological activity and having a chroman-like heterocyclic nucleus including a benzenoid ring. Four tocopherols have been found in nature and designated respectively as alpha-tocopherol, beta-tocopherol, gamma-tocopherol and delta-tocopherol. The tocopherols occur widely in nature, particularly rich sources being vegetable oils such as soybean oil, cottonseed oil, corn oil, wheat germ oil and the like. Of these tocopherols, alpha-tocopherol exhibits more than twice the vitamin E biological activity exhibited by the non-alpha tocopherols, such activity being evaluated by means of the resorption sterility test on rats. The higher vitamin E potency of alpha-tocopherol is evident whether the tocopherols are in the form of free tocopherols or in the form of esters, the tocopherols being readily esterified by any of the well-known esterification procedures such as treatment with an acid halide or an anhydride.

The non-alpha tocopherols are characterized by having at least one aromatic hydrogen atom on the benzenoid nucleus. In the case of beta-, gamma- and delta-tocopherol, the aromatic hydrogen atoms are ortho to the phenolic hydroxyl group characteristic of all tocopherols and appearing in the 6 position on the nucleus. The tocopherols, like other aromatic compounds having a substituent nuclear hydroxyl group, are normally resistant to direct alkylation on the nucleus ortho to such hydroxyl group.

Since non-alpha tocopherols form a substantial part of the available naturally-occurring tocopherol material, it is desirable to provide methods for enhancing the vitamin E biological activity of such lower potency tocopherols and tocopheryl esters. It has now been found that the potency of non-alpha tocopherol material is enhanced by subjecting such lower potency tocopherol material to formylation and reduction as set out in the copending application of Weisler Serial No. 123,986, filed October 27, 1949.

It is an object of this invention to provide a new and useful method of treating tocopherol material.

It is a further object of the invention to convert low potency tocopherol material to a form readily convertible to alpha-tocopherol.

Another object of the invention is to aid in enhancing the potency of low potency tocopherol material by providing an effective and economical method of formylating tocopherol material.

Another object is to provide a new method of enhancing the vitamin E activity of low potency tocopherol material.

Another object of the invention is to provide a commercially feasible method of formylating tocopherol material characterized by having at least one aromatic hydrogen atom in the benzenoid nucleus.

Another object of the invention is to provide a method for readily formylating beta-tocopherol, gamma-tocopherol and delta-tocopherol.

Other objects will be apparent from the description and claims which follow.

These and other objects of the invention are attained by subjecting tocopherol material, characterized by having at least one aromatic hydrogen atom on the benzenoid nucleus, to formylation effective to replace such aromatic hydrogen atom with a formyl group by iminoalkylating said tocopherol material and hydrolyzing the reaction product to the corresponding formylated tocopherol material. The resulting substituent formyl groups are readily converted to methyl groups by reduction whereby the vitamin E biological activity of the tocopherol material being treated is enhanced.

Formylation in accordance with this invention can be effected with any tocopherol material having at least one aromatic hydrogen atom on the benzenoid nucleus and the method is particularly applicable for treating tocopherol material having an aromatic hydrogen atom on the nucleus ortho to the hydroxyl group. The process embodying the invention can be employed for treating both natural and synthetic tocopherol material whether singly or in admixture with each other and/or with alpha-tocopherol.

Although the process is readily employed for treating the tocopherols in pure form, it is desirable in commercial practice to treat the naturally-occurring mixtures of tocopherols obtained from vegetable oils or the like, preferably after concentration of the tocopherol material by a concentration process such as high vacuum molecular distillation, saponification, selective adsorption, solvent extraction or combinations of any of these or other concentration processes.

The formylated tocopherol derivatives are prepared in accordance with this invention by iminoalkylation and hydrolysis. Iminoalkylation is effected by reacting low potency tocopherol material with hydrogen cyanide and a hydrogen halide in the presence of a metal salt such as a metal halide, zinc and aluminum chlorides being typical examples of suitable metal salts. I have found that the reaction is readily effected, if it is desired to avoid the direct use of hydrogen cyanide gas, by reacting the tocopherol material with a metal cyanide and a hydrogen halide whereby hydrogen cyanide and metal halide are formed during the reaction. Suitable metal cyanides include for example zinc cyanide, sodium cyanide, potassium cyanide, calcium cyanide and the like. Any of the hydrogen halides can be employed although hydrogen fluoride is less preferable than hydrogen chloride, hydrogen bromide and hydrogen iodide because of handling difficulties. In some cases it is desirable to add another metal salt to the reaction mixture to aid in promoting the reaction, as for example the inclusion of aluminum chloride with the metal cyanide and the hydrogen halide.

The reaction is carried out in an organic solvent such as ether, benzene, tetrachloroethane, xylene, toluene or the like. It is preferable to effect reaction in the presence of only small amounts of water or under substantially anhydrous conditions for optimum results, the water content of the reaction mixture being preferably less than about 5% of the mixture and desirably less than 1% of the mixture.

The iminomethylated tocopherol material is then hydrolyzed to the desired formylated tocopherol material. Hydrolysis is readily effected by means of water. The speed of hydrolysis is increased, however, by the presence of hydrogen ions and hydrolysis is preferably effected by means of dilute aqueous acid, desirably a dilute aqueous mineral acid such as a 1–15% aqueous solution of mineral acid.

The resulting formylated tocopherol material can thereafter be subjected to reduction whereby the substituent formyl groups are converted to methyl groups. Formylation of gamma-tocopherol in accordance with this invention gives 5-formyl gamma-tocopherol which is readily reduced to alpha-tocopherol. Formylation of beta-tocopherol gives 7-formyl beta-tocopherol which is similarly reduced to alpha-tocopherol. Formylation of delta-tocopherol usually results in a mixture consisting predominantly of 5-formyl delta-tocopheral together with a lesser amount of 5,7-formyl delta-tocopherol. By reducing the 5-formyl delta-tocopherol to beta-tocopherol and repeating the process, a substantially increased yield of alpha-tocopherol results. Reduction of the substituent formyl groups in the positions normally occupied by an aromatic hydrogen atom is readily effected by means of zinc and mineral acid, by the Clemmensen reduction process, by catalytic hydrogenation at elevated pressures in the presence of a hydrogenation catalyst such as nickel or palladium, or by other well-known reduction processes.

The formyl-substituted tocopherols and tocopheryl esters are themselves biologically active and useful as therapeutic agents in the treatment of certain muscular degenerative diseases such as muscular dystrophy. The formylated derivatives are particularly important as intermediates in processes for enhancing the vitamin E biological activity of relatively low potency tocopherol material. Reduction is effective to reduce formyl groups to methyl groups on either free formyl tocopherols or formyl tocopheryl esters. Both free tocopherols and formylated tocopherols are readily esterified by treatment with an acid halide or anhydride. The acyl esters are preferably employed, and the esters are desirably the esters of fatty acids having not more than 20 carbon atoms. Typical esters include the acetates, benzoates, palmitates, myristates, oleates, stearates and the like esters of free and formylated tocopherols.

The treatment of non-alpha tocopherol material in accordance with this invention is illustrated by the following examples of certain specific embodiments of the invention.

*Example 1*

A gamma-tocopherol concentrate comprising 80% gamma-tocopherol was dissolved in dry ether to give a solution of 8.61 g. of the concentrate in 120 cc. of ether. To this solution was added 4 g. of anhydrous zinc cyanide and dry hydrogen chloride gas was passed through the solution for 2 hours at room temperature while the solution was being stirred. Thereafter, an additional 2 g. portion of zinc cyanide was added to the solution, and dry hydrogen chloride gas was bubbled through the solution for an additional 3 hours. After standing overnight, the solution was diluted with 100 cc. of 2.5 N aqueous sulfuric acid and the resulting mixture was stirred for 6 hours. The ether layer was separated from the aqueous layer, washed with water, dried and evaporated. The residual concentrate thus obtained contained 9 g. of 5-formyl gamma-tocopherol having $$E_{1\,cm.}^{1\%}(286\ m\mu) = 130$$

The conversion of gamma-tocopherol to the formyl derivative was approximately 75%.

*Example 2*

A mixed tocopherol concentrate containing 61% total tocopherol in the ratio of 2 parts of gamma-tocopherol to 1 part of delta-tocopherol was dissolved in tetrachloroethane which had been dried over potassium carbonate, to give a solution of 23.9 g. of concentrate in 330 cc. of solvent. Ten grams of anhydrous zinc cyanide was added to the solution and the resulting mixture was cooled to 0° C. Dry hydrogen chloride gas was passed into the mixture for 30 minutes. The reaction was accelerated by slowly adding to the reaction mixture 9.2 g. of aluminum chloride, and hydrogen chloride gas was bubbled through the mixture for an additional 90 minutes, during which time the mixture was allowed to warm up to room temperature. An additional 3.0 g. portion of zinc cyanide was added to the mixture and hydrogen chloride gas was passed into the mixture for 90 minutes at 35°–40° C. The reaction mixture was thereafter diluted with 200 cc. of cold 2.5 N aqueous sulfuric acid and allowed to stand overnight. The diluted mixture was then refluxed and stirred for 15 minutes, cooled, and poured into water. The tetrachloroethane layer was separated out, washed, dried, and the tetrachloroethane distilled off under vacuum leaving a concentrate of formylated tocopherol material as a red, mobile oil. This oil was distilled at about 180° C. in a high vacuum still to give a distillate having $$E_{1\,cm.}^{1\%}(282\ m\mu) = 147$$

and $$E_{1\,cm.}^{1\%}(388\ m\mu) = 43.5$$

When a sample of the distillate was added to a 1% solution of 2,4-dinitrophenyl hydrazine in ethyl alcohol, a deep red hydrazone was precipitated,

Example 3

A 20 g. portion of delta-tocopherol concentrate (70% delta-tocopherol) was dissolved in 330 cc. of dry tetrachloroethane, the solution mixed with 10 g. of zinc cyanide and the resulting mixture was cooled to 0° C. Dry hydrogen chloride gas was bubbled through the mixture for 30 minutes, after which time 9.2 g. of aluminum chloride was added slowly while the mixture was being stirred. Dry hydrogen chloride was passed into the mixture for 2 hours at room temperature, 3 g. of zinc cyanide was added, and hydrogen chloride was passed through the mixture for an additional 2.5 hours. The mixture was diluted by adding thereto 200 cc. of 2.5 N sulfuric acid while the mixture was being stirred and cooled. The acidified mixture, after standing overnight at room temperature, was heated at 60°-70° C. and stirred for 45 minutes. It was thereafter cooled with ice and extracted with ether. The ether extract was washed and dried, the ether evaporated at atmospheric pressure and the tetrachloroethane removed under vacuum. The residue was a limpid red oil giving a deep red precipitate with 2,4-dinitrophenyl hydrazine solution and having $$E_{1\ cm.}^{1\%}\ (282\ m\mu) = 99$$

and $$E_{1\ cm.}^{1\%}\ (380\ m\mu) = 20$$

The residue was then separated into two fractions by molecular distillation at 180°-200° C., the distillate being a deep red oil having $$E_{1\ cm.}^{1\%}\ (282\ m\mu) = 119$$

Example 4

Beta-tocopherol was converted to 7-formyl beta-tocopherol by the following procedure. A reaction mixture was prepared by mixing 10.5 g. of a 64% beta-tocopherol concentrate and 6.2 g. of zinc cyanide with 200 cc. of dry chloroform. The resulting mixture was cooled to 0° C. and dry hydrogen chloride gas was passed through the mixture for 20 minutes whereupon the mixture was gradually warmed to 40° C. over a period of two hours. The reaction mixture was diluted with 100 cc. of a 10% aqueous solution of hydrochloric acid and the mixture was stirred for 20 minutes under reflux. It was then diluted with water and extracted with ether. The ether extract was washed with water, dried, and the ether removed by evaporation, leaving a reddish residual oil comprising 7-formyl beta-tocopherol.

Example 5

A mixture of gamma- and delta-tocopherols was treated as in Example 2 to give a formylated tocopherol concentrate. The concentrate was dissolved in isopropyl ether, and treated with equal its weight of powdered zinc and concentrated hydrochloric acid to reduce substituent formyl groups to methyl groups. Reduction was effected by heating the mixture for 90 minutes at 40° C. The mixture was then diluted with water the ether layer separated, washed to neutrality and the ether removed by evaporation. Conversion of the original low potency tocopherols to alpha-tocopherol was shown by the preparation of alpha-tocopherol acid succinate melting at 66°-67° C.

Reduction of other formyl tocopherol derivatives in similar fashion also resulted in conversion of the formylated tocopherols to alpha-tocopherol. The process of the invention involving formylation and reduction was found to enhance the vitamin E biological activity of beta-, gamma- and delta-tocopherols as well as various esters of such tocopherols, formylation being effected by iminomethylation and hydrolysis, and reduction by means of zinc and mineral acid or by catalytic hydrogenation or similar reduction process.

The invention thus provides an economically feasible method of treating relatively low potency tocopherols and tocopheryl esters to convert such tocopherols and esters to formylated tocopherol derivatives readily reducible to alpha-tocopherol of greater vitamin E potency than the material being treated.

While the invention has been described in considerable detail with reference to certain preferred embodiments, variations and modifications can be effected without departing from the spirit and scope of the invention as described hereinabove and as defined in the appended claims.

What I claim is:

1. The method of making biologically active material which is readily reducible to material having enhanced vitamin E biological activity which comprises iminomethylating and hydrolyzing tocopherol material normally possessing relatively low vitamin E biological activity and having at least one aromatic hydrogen atom on the benzenoid nucleus, said iminomethylating being effected by reacting said tocopherol material with hydrogen cyanide and a hydrogen halide in the presence of a metal salt, said iminomethylating and hydrolyzing being effective to replace said aromatic hydrogen atom with a formyl group.

2. The method of making biologically active material which is convertible by reduction to material of high vitamin E biological activity which comprises iminomethylating a tocopherol compound having at least one aromatic hydrogen atom on the benzenoid nucleus and being selected from the class consisting of beta-tocopherol, gamma-tocopherol and delta-tocopherol, and hydrolyzing the resulting iminomethylated tocopherol compound, said iminomethylating and hydrolyzing being effective to replace said aromatic hydrogen atom with a formyl group, said iminomethylating being effected by reacting said tocopherol compound with a hydrogen halide and a material furnishing hydrogen cyanide during said reacting.

3. The method of making biologically active material which is convertible by reduction to material having substantially enhanced vitamin E biological activity which comprises iminomethylating and hydrolyzing a tocopherol compound having at least one aromatic hydrogen atom on the nucleus and being selected from the class consisting of beta-tocopherol, gamma-tocopherol and delta-tocopherol and thereby replacing said aromatic hydrogen atom with a formyl group, said iminomethylating being effected by reacting said tocopherol compound with hydrogen cyanide and a hydrogen halide in the presence of a metal salt.

4. The method of making biologically active material which is convertible by reduction to material having high vitamin E biological activity which comprises iminomethylating and hydrolyzing a tocopherol compound having at least one aromatic hydrogen atom on the nucleus and being selected from the class consisting of beta-tocopherol, gamma-tocopherol and delta-tocopherol and thereby replacing said aromatic hydrogen atom with a formyl group, said iminomethylating being effected by reacting said tocopherol compound with a metal cyanide and a hydrogen halide.

5. The method of making a biologically active derivative of delta-tocopherol which comprises replacing at least one of the aromatic hydrogen atoms present in the 5 and 7 positions of delta-tocopherol with a formyl group by subjecting delta-tocopherol to iminomethylation and hydrolysis, said iminomethylation being effected by reacting said delta-tocopherol with hydrogen cyanide and a hydrogen halide in the presence of a metal salt.

6. The method of making a biologically active derivative of gamma-tocopherol which is convertible by reduction to alpha-tocopherol which comprises replacing the aromatic hydrogen atom in the 5 position on the nucleus of gamma-tocopherol with a formyl group by subjecting gamma-tocopherol to iminomethylation and hydrolysis, said iminomethylation being effected by reacting said gamma-tocopherol with hydrogen cyanide and a hydrogen halide in the presence of a metal salt.

7. The method of making a biologically active derivative of beta-tocopherol which is convertible by reduction to alpha-tocopherol which comprises replacing the aromatic hydrogen atom in the 7 position of beta-tocopherol with a formyl group by subjecting beta-tocopherol to iminomethylation and hydrolysis, said iminomethylation being effected by reacting said beta-tocopherol with hydrogen cyanide and a hydrogen halide in the presence of a metal salt.

8. The method of making a biologically active delta-tocopherol derivative which is convertible by reduction to alpha-tocopherol which comprises replacing the aromatic hydrogen atoms in the 5 and 7 positions on the nucleus of delta-tocopherol with formyl groups by subjecting delta-tocopherol to iminomethylation and hydrolysis, said iminomethylation being effected by reacting said delta-tocopherol with hydrogen cyanide and a hydrogen halide in the presence of a metal salt.

9. The method of enhancing the vitamin E biological activity of tocopherol material of relatively low potency which comprises formylating and reducing tocopherol material having at least one aromatic hydrogen atom on the benzenoid nucleus, said formylating being effected by subjecting said tocopherol material to iminomethylation effected by reacting said tocopherol material with hydrogen cyanide and a hydrogen halide in the presence of a metal salt, and hydrolysis whereby said aromatic hydrogen atom is replaced by a formyl group.

10. The method of enhancing the vitamin E biological activity of relatively low potency tocopherol material which comprises formylating and reducing a tocopherol compound having at least one aromatic hydrogen atom in the nucleus and being selected from the class consisting of beta-tocopherol, gamma-tocopherol, delta-tocopherol, and esters thereof, said formylation and reduction being effective to replace said aromatic hydrogen atom with a methyl group, said formylation being effected by reacting said tocopherol compound with a metal cyanide and a hydrogen halide and thereafter hydrolyzing the product of said reacting.

11. The method of enhancing the vitamin E biological activity of tocopherol material possessing relatively low vitamin E activity which comprises formylating and reducing a tocopherol compound having at least one aromatic hydrogen atom on the nucleus and being selected from the class consisting of beta-tocopherol, gamma-tocopherol, delta-tocopherol and esters thereof, said formylating and reducing being effective to replace at least one said aromatic hydrogen atom with a methyl group, said formylation being effected by reacting said tocopherol compound with zinc cyanide and a hydrogen halide and hydrolyzing the product of said reacting.

12. The method of enhancing the vitamin E biological activity of gamma-tocopherol which comprises replacing the aromatic hydrogen atom in the 5 position of gamma-tocopherol with a methyl group by subjecting gamma-tocopherol to formylation and reduction, said formylation being effected by subjecting said gamma-tocopherol to iminomethylation and hydrolysis, said iminomethylation comprising reacting said delta-tocopherol with hydrogen cyanide and a hydrogen halide in the presence of a metal salt.

13. The method of enhancing the vitamin E biological activity of beta-tocopherol which comprises replacing the aromatic hydrogen atom in the 7 position on the nucleus of beta-tocopherol with a methyl group by formylating and reducing beta-tocopherol, said formylating being effected by subjecting said beta-tocopherol to iminomethylation and hydrolysis, said iminomethylation comprising reacting said beta-tocopherol with hydrogen cyanide and a hydrogen halide in the presence of a metal salt.

14. The method of enhancing the vitamin E biological activity of delta-tocopherol which comprises replacing at least one of the aromatic hydrogen atoms in the 5 and 7 positions on the nucleus of delta-tocopherol with a methyl group by formylating and reducing delta-tocopherol, said formylating being effected by subjecting said delta-tocopherol to iminomethylation followed by hydrolysis, said iminomethylation comprising reacting said delta-tocopherol with hydrogen cyanide and a hydrogen halide in the presence of a metal salt.

15. The method of enhancing the vitamin E biological activity of delta-tocopherol which comprises replacing the aromatic hydrogen atoms in the 5 and 7 positions on the nucleus of delta-tocopherol with methyl groups by formylating and reducing delta-tocopherol, said formylating being effected by subjecting said delta-tocopherol to iminomethylation and hydrolysis, said iminomethylation comprising reacting said delta-tocopherol with hydrogen cyanide and a hydrogen halide in the presence of a metal salt.

LEONARD WEISLER.

REFERENCES CITED

The following references are of record in the file of this patent:

Adams, J. Am. Chem. Soc., 45, 2373–2377 (1923).

Smith, J. Am. Chem. Soc., 56, 474 (1934).